United States Patent [19]
Buickel et al.

[11] Patent Number: 5,740,362
[45] Date of Patent: Apr. 14, 1998

[54] MANAGEMENT OF NETWORK DISTRIBUTED AGENTS IN A DISTRIBUTED COMPUTING ENVIRONMENT

[75] Inventors: Larry Lee Buickel, Austin; Debbie Ann Godwin, Pflugerville; Howard Daniel Hamilton; Kathryn Isobel Hansen, both of Austin, all of Tex.; Charlie Buddy Harvey, Jr., Golden, Colo.

[73] Assignee: International Business Machines Corporation, Armonk, N.Y.

[21] Appl. No.: 554,431

[22] Filed: Nov. 6, 1995

[51] Int. Cl.$^6$ .................................................. G06F 17/30
[52] U.S. Cl. ............................... 395/200.03; 395/200.02; 395/610; 707/10
[58] Field of Search ........................ 395/200.02, 200.03, 395/610

[56] References Cited

U.S. PATENT DOCUMENTS

| | | | |
|---|---|---|---|
| 5,142,622 | 8/1992 | Owens | 395/200.02 |
| 5,181,162 | 1/1993 | Smith et al. | 395/792 |
| 5,235,642 | 8/1993 | Wobber et al. | 380/25 |
| 5,263,157 | 11/1993 | Janis | 395/609 |
| 5,263,158 | 11/1993 | Janis | 395/601 |
| 5,263,165 | 11/1993 | Janis | 395/683 |
| 5,323,384 | 6/1994 | Norwood et al. | 310/254 |
| 5,369,570 | 11/1994 | Parad | 395/208 |
| 5,377,323 | 12/1994 | Vasudevan | 395/200.16 |
| 5,377,350 | 12/1994 | Skinner . | |
| 5,497,463 | 3/1996 | Stein et al. | 395/200.03 |

FOREIGN PATENT DOCUMENTS

| | | | |
|---|---|---|---|
| 21894 | 1/1994 | China | H04L 29/02 |
| 0 589 249 A2 | 9/1992 | European Pat. Off. | G06F 9/44 |
| 6-22028 | 1/1994 | Japan . | |

OTHER PUBLICATIONS

Rao et al., "Accessing Files in An Internet: The Jade File System", IEEE Transactions on Software Engineering, vol. 19, No. 6, Jun., 1993, pp. 613–624.

IBM TDB, "Object Attributes on Demand in a Cooperative Processing Environment", vol. 37, No. 09, Sep. 1994, pp. 79–82.

IBM TDB, "Dynamic Collection of Advanced Peer-to-Peer Networking Network Tolology and Graphical Display on a Programmable Workstation", vol. 36, No. 07, Jul. 1993, pp. 345–348.

IMB TDB, "Caching and Recovery of Catalog Information in Distributed Query Compilation", vol. 27, No. 8 Jan. 1985, pp. 4795–4797.

IBM TDB, "Technique for Replacing Distributed Directory Information", vol. 33, No. 12, May 1991, pp. 113–120.

Primary Examiner—Paul R. Lintz
Attorney, Agent, or Firm—Richard A. Henkler

[57] ABSTRACT

A method and system for providing a single access point for the resources of application programs distributed within a network. The single access point is provided via a master object comprising an application identification list and a plurality of application procedure interfaces. Each of the application programs has an associated agent for managing the resources of the associated application program. These agents manage the resources using a subset of the plurality of application procedure interfaces of the master object. The application identification list of the master object is used for storing the binding handle of the agent as well as the identification for the associated application. A client or user accesses the resources of a particular application program by specifying the identification of the application program and the required action to be taken by the application program to the master object. The master object uses this information to search the application identification list for a matching application identification, and after finding one, thereafter invoking the corresponding application procedure interface in the agent identified by the matching binding handle. Thus, invoking the required resource of the application program to perform the requested action.

18 Claims, 5 Drawing Sheets

MANAGEMENT OF NETWORK DISTRIBUTED AGENTS IN A DISTRIBUTED COMPUTING ENVIRONMENT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

1. Field of the Present Invention

The present invention generally relates to Local Area Networks (LANs), and more specifically, to methods and systems for managing network distributed agents within a LAN.

2. History of Related Art

In today's world of computers, Local Area Networks (LANs) support a variety of computing environments. One such environment, which has become quite popular, is the Distributed Computing Environment (DCE). DCE is produced by the Open Software Foundation and explained in detail in "OSF [TM] DCE Application Development Reference" by OSF (1993), which is hereby incorporated by reference herein. DCEs, typically, include a plurality of DCE servers, such as directory, security, time, and file, and must also include at least one cell as defined by subscribing members. The current use of DCEs, however, is hampered by several different factors.

One such factor is the burdensome requirement that each DCE cell member desiring to communicate with a particular DCE application server must know and/or obtain the binding handle of that DCE application server. The binding handle is usually obtained by the DCE cell member using complex and low level DCE Application Program Interface (API) calls. This unnecessarily adds complexity to the overall DCE system.

Another such factor results from the storing of the binding handles for each of the DCE application servers in the namespace of a particular DCE cell. Over a period of time, however, the binding handles may become stale or incorrect. If the stale or incorrect binding handles are used by a DCE cell member, then a DCE Administrator must be contacted to correct the stale or incorrect binding handles in the namespace. Unfortunately, this results in shutting down the DCE application server and restarting it in order to access the updated binding information.

It would, therefore, be a distinct advantage to have a method and system in which a DCE cell member could communicate with a DCE application server without requiring the member to know or obtain the binding handle of the DCE application server each time communication is held, and which would also maintain current binding information for each of the DCE application servers. The present invention provides such a method and system.

SUMMARY OF THE PRESENT INVENTION

The present invention is a method and system for providing a single reference point for accessing the resources of application programs distributed within a network.

In one aspect, the present invention is a method of invoking the resources of application programs executing in a distributed computing environment. Each one of the application programs having an agent and a principal name, and each one of the agents being identified by an individual binding handle. The method includes the step of storing the principal names and the binding handles together in a principal name list of a master object. The method further includes the step of locating, in the principal name list, one of the stored binding handles for an identified one of the application programs to execute a request. The method also includes the step of executing the agent identified by the binding handle to invoke the identified application program to execute the request.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
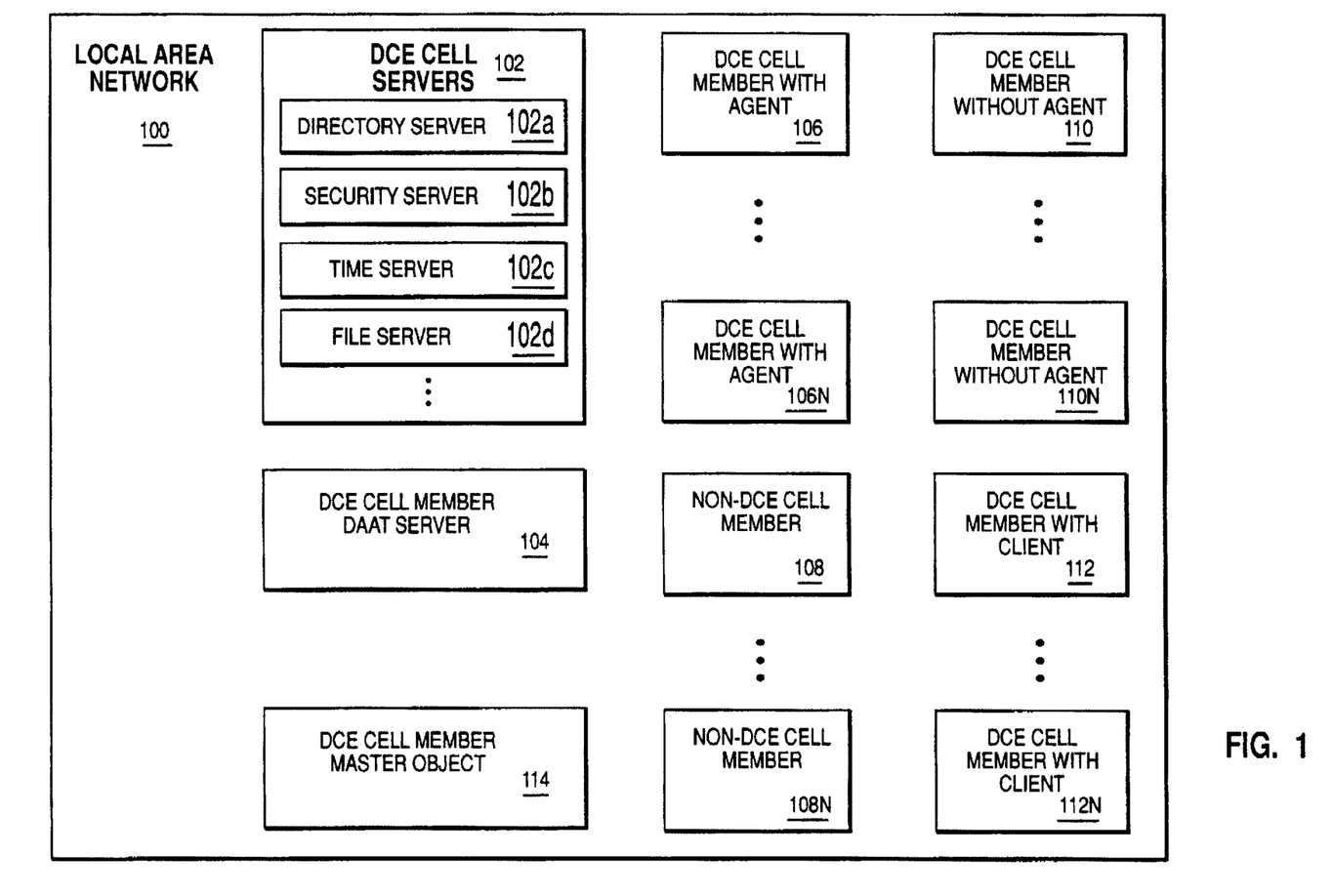
FIG. 1 is a schematic diagram illustrating various components of a Local Area Network (LAN) according to the teachings of the present invention.

Reference now being made to FIG. 1, a schematic diagram is shown illustrating various components of a Local Area Network (LAN) 100 according to the teachings of the present invention. The LAN 100 is heterogeneously populated with DCE cell members 106-106$n$, 110-110$n$, and 112—112$n$, non-DCE cell members 108-108$n$, Distributed Access Administration Tool (DAAT) server 104, and Master Object (MOB) 114. In this particular embodiment, a DCE cell is defined by DCE cell servers 102, DCE cell members 106-106$n$ with agents, DCE cell members 110-110$n$ without agents, and DCE cell members 112-112$n$ with clients. It is well understood by those of ordinary skill in the art that any DCE cell is defined by its members, and therefore, the boundaries of the DCE cell are logical as opposed to geographical. It should also be clearly understood that the LAN 100 is merely illustrative of one of numerous variations in which the present invention can be practiced.

Figure 2:
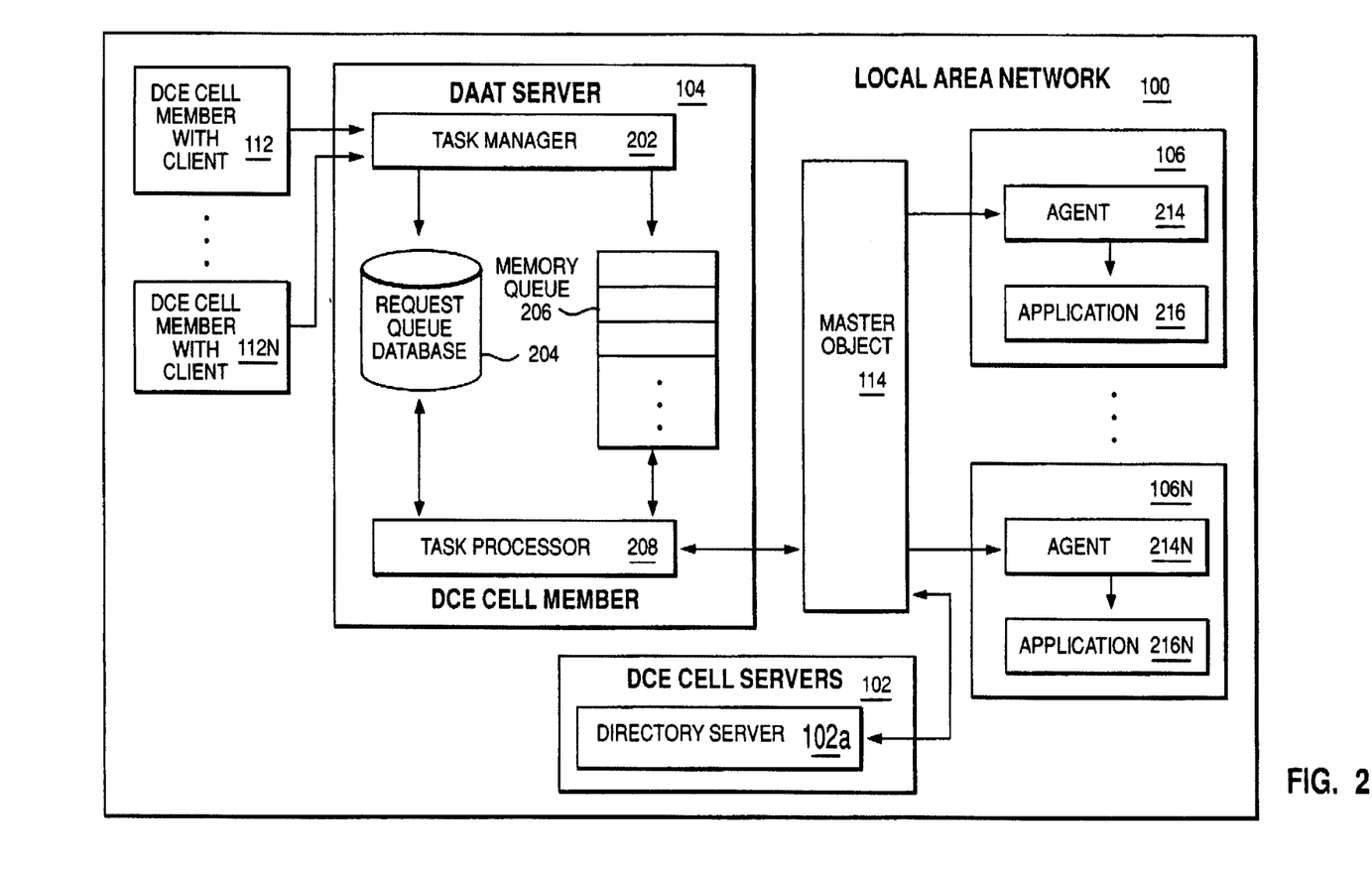
FIG. 2 is a block diagram illustrating in greater detail selected components of the LAN of FIG. 1 according to the teachings of the present invention.

Reference now being made to FIG. 2, a block diagram is shown illustrating in greater detail selected components of the LAN 100 of FIG. 1 according to the teachings of the present invention. As is shown in FIG. 2, each of the DCE cell members having a client 112-112$n$ communicate with DAAT server 104, which in turn communicates with Master Object (MOB) 114. MOB 114 communicates with DCE Cell servers 102 and DCE cell members 106-106$n$ having an agent 214-214$n$. Each one of the agents 214-214$n$ has an application 216-216n, respectively. A brief description of each one of the above noted components is provided below.

Each one of the DCE cell members 112-112n gather data from their respective users and send requests to DAAT 104. The requests may be, for example, creation of a user ID, deletion of a user ID, or ID password reset.

DAAT server 104 process these requests by communicating with applications 216-216n via MOB 114 and agents 214-214n, respectively. DAAT server 104 includes a task manager 202, a request queue database 204, a memory queue 206, and a task processor 208. DAAT 104 also includes application identifications implemented as DCE principal names (AppIds) to reference each one of the applications 216-216n. In general, DAAT server 104 is a client/server application which administers resources of the LAN 100 such as TCP/IP addresses, Lotus Notes user IDs, AFS user IDs, and the like.

MOB 114, essentially, provides a single access point to agents 214-214n, and the ability to recognize and access new agents (not shown) without requiring a "shut down and/or restart" of DAAT server 104.

Agents 214-214n are servers\clients to applications 216-216n, respectively, and are written by customers using DCE. In general, agents 214-214n manage resources and monitor requests from DAAT server 104 to perform actions on those resources. Applications 216-216n are application programs such as, mail communication, or the like. A more detailed description of the interaction between the various above noted components for the processing of a request is provided hereinafter.

Each one of the DCE members 112-112n provide requests to DAAT 104 in a formatted string context. Each request includes a task action such as available, enroll, unenroll, suspend, resume, transfer, rename, query, list, or update.

The task manager 202 receives requests from DCE members 112-112n, stores them in the request queue database 204, and places notifications of the requests in the memory queue 206. The task processor 208 receives these notifications by monitoring the memory queue 206. Thereafter, the requests are forwarded to MOB 114 with an AppId.

Figure 3:
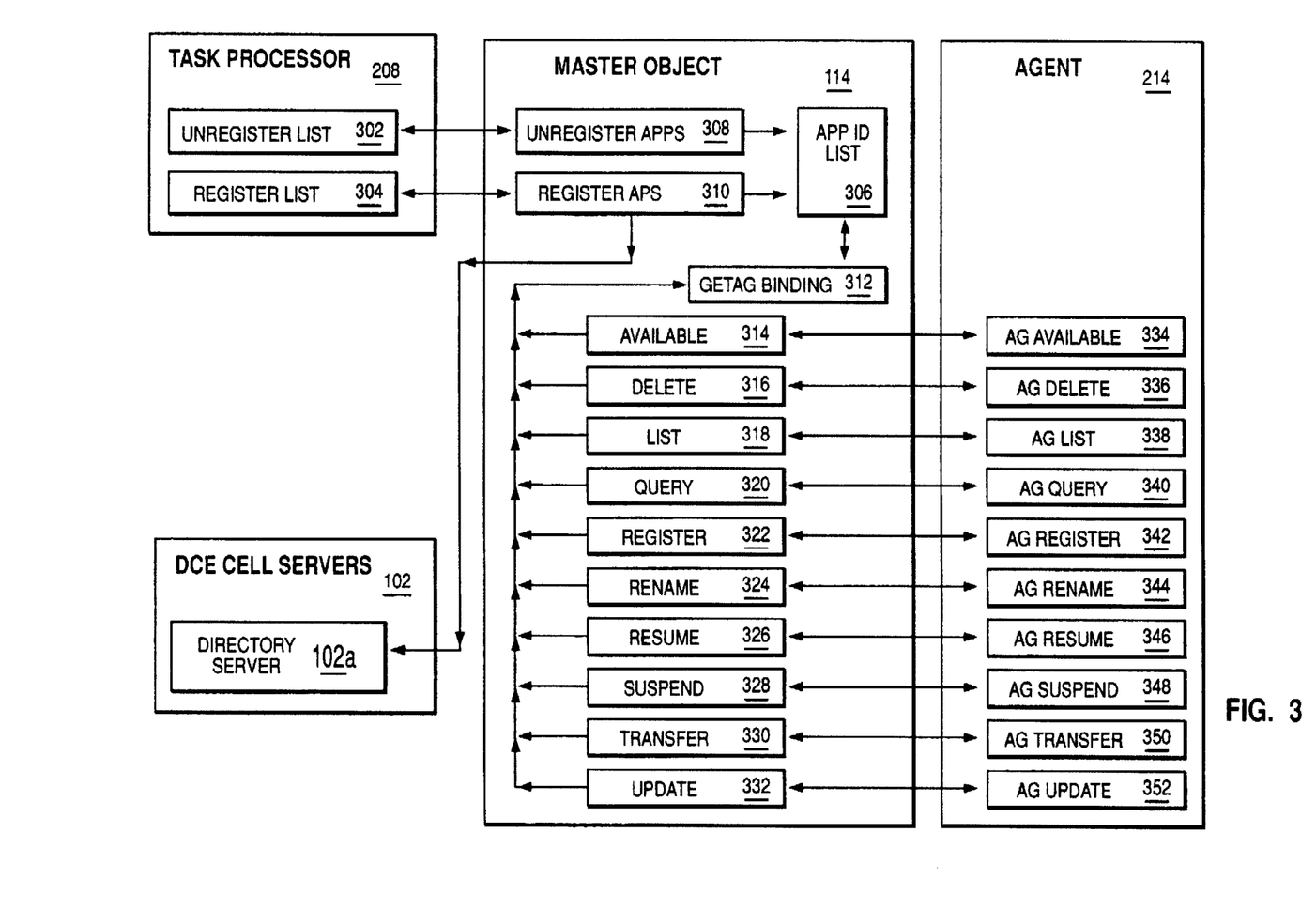
FIG. 3 is a block diagram illustrating the relationships between the selected components of FIG. 2 according to the teachings of the present invention.

Reference now being made to FIG. 3, a block diagram is shown illustrating the relationships between agent 214, MOB 114, DCE cell servers 102, and task processor 208 of FIG. 2 according to the teachings of the present invention. Each of the agents 214-214n utilize Application Program Interfaces (APIs) which allow communication between the MOB 114 and each agent 214-214n. For example, agent 214 includes, the following APIs: AgAvailable 334;; AgDelete 336; AgList 338; AgQuery 340; AgRegister 342; AgRename 344; AgResume 346; AgSuspend 348; AgTransfer 350; and AgUpdate 352.

MOB 114 includes functions UnRegisterApps 308, RegisterApps 310, and getagbinding 312. MOB 210 also includes an agent list 306, and the following APIs; Available 314; Delete 316; List 318; Query 320; Register 322; Rename 324; Resume 326; Suspend 328; Transfer 330; and Update 332. As previously stated in connection with FIG. 2, MOB 114 is a single reference point for communication between DAAT server 104 and agents 214-214n. Binding information for each of the agents 214-214n is maintained within the agent list 306 of MOB 114. The maintenance of the agent list 306 allows agents to be registered, unregistered, updated via MOB 114 without restarting or shutting down DAAT 104.

Upon further examination of FIG. 3, it is clear that a one-to-one relationship between APIs 314-332 of MOB 114 and APIs 334-352 of agent 214 exists. It should be understood, however, that agent 214, or any other agent supported by MOB 114, can contain a smaller subset of the API's 314-332 as well. An example of a possible set of API's for MOB 114 is illustrated in pseudo code in Attachment A.

In this particular example, each agent, executing on LAN 102 (FIG. 2), has a principal name maintained by the DCE directory server 102a, and an associated binding handle. The agent list 306 maps a registered agent's principal name and binding handle together. This effectively caches the binding handles for the associated agents.

MOB INITIALIZATION

The agent list 306 is created and initialized during the initialization of DAAT 104 (FIG. 2). The task processor 208 creates a register list 304 for all agents which have been registered in DAAT 104. An Application Administrator registers an application to DAAT 104 by adding it and the tasks it supports to DAAT 104. In the preferred embodiment of the present invention only agents which have a status of "started" will be recognized by DAAT 104 for registration. Accordingly, agents which have a status of either "suspended" or "not ready" are not recognized for registration by DAAT 104.

The register list 304 includes the agents principal name in the DCE directory server 102a. Task processor 208 then invokes RegisterApps 310, and passes the register list 304. MOB 114 traverses the register list 304 and iteratively queries the DCE directory server 102a for the binding handles for each of the agents entries contained in the register list 304. If a binding handle is found for an agent entry, then one of two things can occur. One, if the agent entry already has an entry in the agent list 306, then the existing binding handle and principal name are replaced with the found binding handle and the principal name contained in the register list 304. Two, if an entry for the agent does not exist in the agent list 306, then an entry is added. Regardless, once the binding handle is found for the agent, the agent entry is removed from the register list 304. If a binding handle is not found for an agent, then the agent remains in the register list 304.

After the register list 304 has been traversed, RegisterApps 308 returns the register list 304 and a return code, which indicates a completion state, to task processor 208. The return code can be any of the following:

AG_SUCCESS—If all agents are successfully added to the agent list 306;

AG_APPNOADD—If one or more agents cannot be added to the agent list 306; or

AG_MISCERR—If there is some catastrophic error within MOB 114. The state of the passed register list 304 is undefined and should not be used by the task processor 208. The entire register list 304 should be resubmitted by the task processor 208 at later point in time.

The register list 304 is maintained by task processor 208. If the register list 304 is passed back from MOB 114 with agent entries remaining, then task processor 208 resubmits the registration list 304 to MOB 114 at a user defined time interval until the registration list 304 is empty.

Agents can also be unregistered from MOB 114 without restarting and/or shutting down DAAT 105 (FIG. 2). Agents which have been requested to be unregistered have an entry in an unregister list 302 which is maintained by the task processor 208. The task processor 208 unregisters agents by invoking UnRegisterApps 308, and passing the unregister list 302. UnRegisterApps 308 processes each agent entry in the unregister list 302 by traversing the agent list 306 for a matching entry. If a matching entry is found, then the entry is removed form the agent list 306 and the unregister list 302. If, however, a matching entry is not found, then the entry remains in the unregister list 302.

After UnRegisterApps 210 has processed each agent entry in the unregister list 302, UnRegisterApps 308 returns the unregister list 302 and a return code to indicate a completion state to task processor 208. The return code can be any of the following:

AG_SUCCESS—If all agents are removed from the unregister list 302;

AG_APPNODEL—If a matching entry is not found for any of the agents in the unregister list 302; or AG_MISCERR—If there is some catastrophic error in MOB 114. The state of the unregister list 302 is undefined and should not be used by the task processor 208. The task processor 208 is required to resubmit the request using a new unregister list 302 at a user defined time interval.

Task processor 208 also periodically checks to see if all specified agents are running. If an agent does not respond for a specified number of user defined attempts, then the Application Administrator is notified by task processor 208 that the agent is inoperative. If the Application Administrator cannot be located, then the notification is sent to the DAAT 104 Administrator.

MOB PROCESSING DAAT REQUEST

Figure 4:
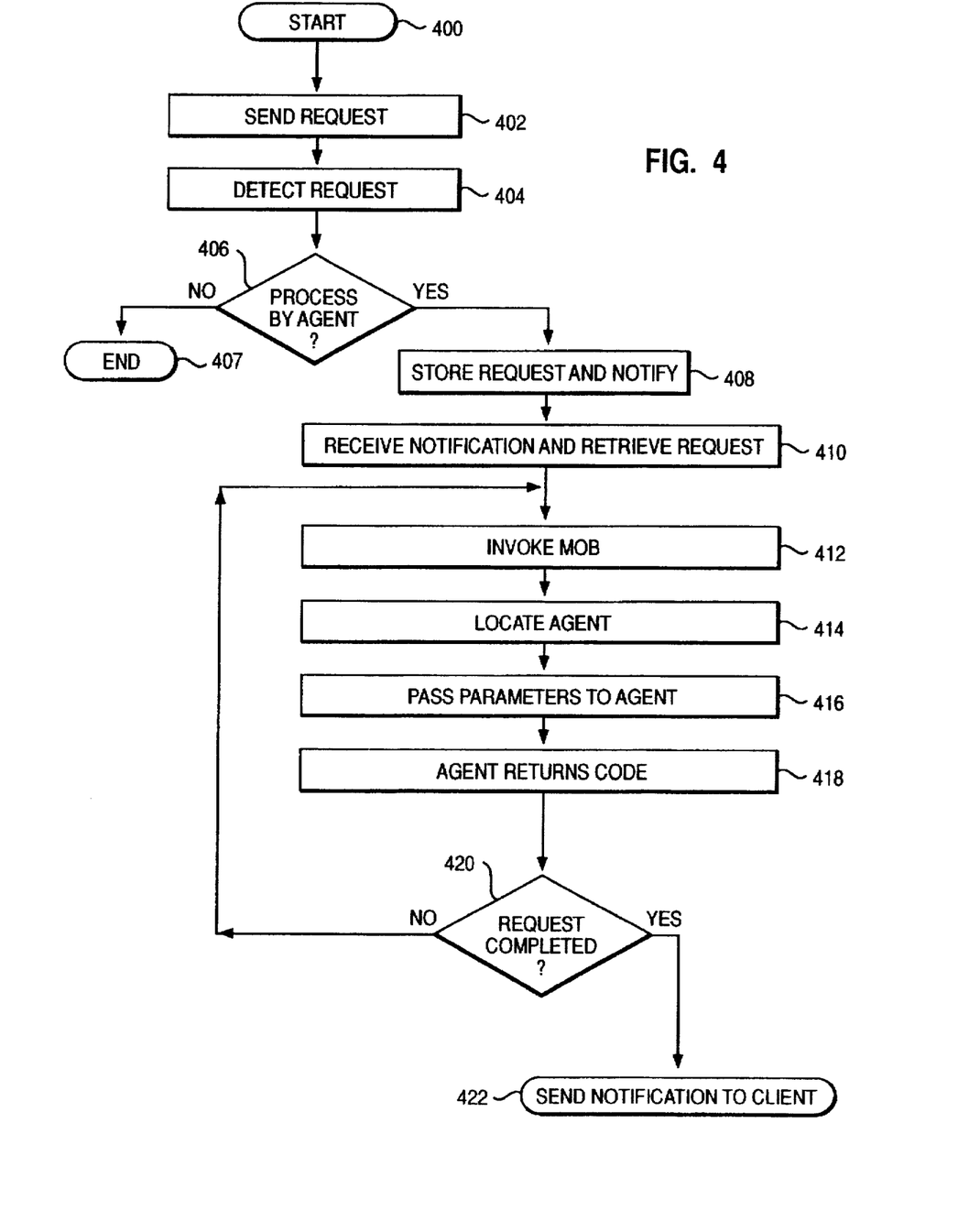
FIG. 4 is a flow chart illustrating the steps for processing a request sent by one of the Distributed Computing Environment (DCE) cell members having a client of FIG. 2 according to the teachings of the present invention.

Referring now to FIG. 4, a flow chart is shown illustrating the steps for processing a request sent by one of the DCE cell members 112-112n of FIG. 2 according to the teachings of the present invention. The process begins at step 400 and proceeds to step 402 where one of the DCE cell members 112-112n (FIG. 2) sends a request to DAAT 104. The request may be, for example, an enrollment, status, or unenrollment. Thereafter, the process proceeds to step 404 where the task Manager 202 (FIG. 2) detects and receives the request. The process then proceeds to step 406 where the task Manager 202 determines whether or not the received request needs to be processed by one of the agents 214-214n (FIG. 2). If, at step 406, it is determined that the received request does not need to be processed by one of the agents 214-214n, then the process proceeds to end at step 407. If, however, at step 406, it is determined that the received request needs to be processed by one of the agents 214-214n, then the process proceeds to step 408.

At step 408, the request is placed in the request queue database 204 (FIG. 2), and a notification of the request is placed in the memory queue 206 (FIG. 2). Thereafter, the process proceeds to step 410 where the task processor 208 receives the notification and retrieves the request from the request queue database 204. The process then proceeds to step 412 where task processor 208 invokes MOB 114 passing an AppId, other parameters (information), and the formatted string with user data. Thereafter, at step 414, MOB 114 invokes one of the APIs 314-332 corresponding to the request. The invoked API 314-332, then uses getagbinding 312 to traverse the AppId list 306 for an entry having an AppId matching the request AppId. Assuming a matching AppId is found, getagbinding 312 retrieves a binding handle for the agent 214-214n corresponding to the matching AppId from the AppId list, and returns the binding handle to the invoked API 314-332. The API 314-332 then use the binding handle to pass the parameters and formatted string to the agent 214-214n corresponding to the request AppId.

The process then proceeds to step 418 where the corresponding agent 214-214n returns a code to DAAT 104 indicating whether the request was completed. At step 420, the return code is examined by DAAT 104 to determine whether or not the request was completed. If, at step 420, it is determined that the request was completed, whether it was successful or a failure, then the process proceeds to step 422 where notification is passed to the requesting DCE Cell member 112-112n.

If, however, at step 420, it is determined that the request was not completed, then the process proceeds back to step 412 and repeats the above enumerated process from that point.

Figure 5:
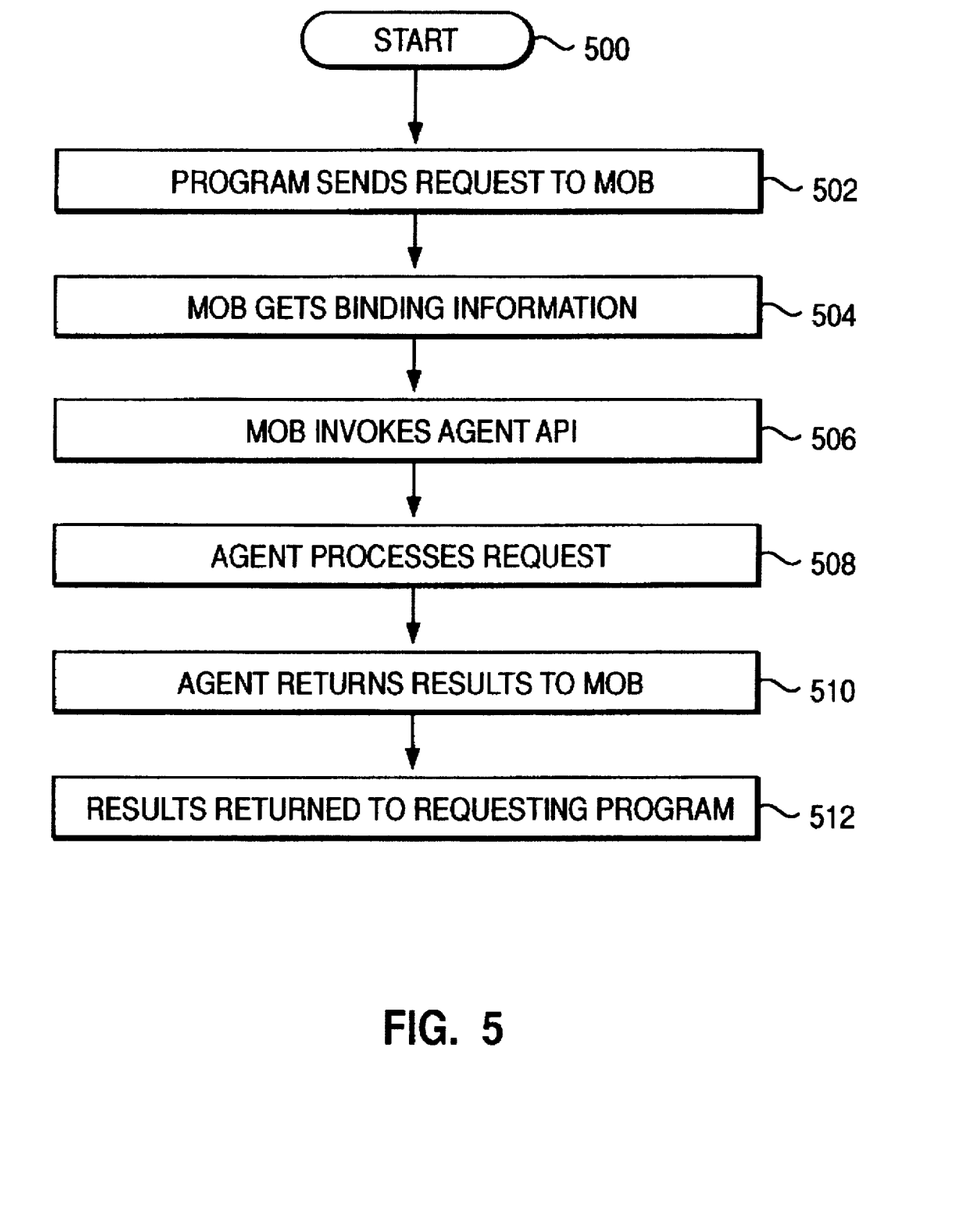
FIG. 5 is a flow chart illustrating the steps for processing a request received from an application program by the Master Object (MOB) of FIG. 2 according to the teachings of the present invention.

Reference now being made to FIG. 5, a flow chart is shown illustrating the steps for processing a request received from an application program by MOB 114 according to the teachings of the present invention. The flow chart illustrated in FIG. 5 represents an alternative embodiment of the present invention in which DAAT 104 of FIG. 2 and its related components are no longer present. The process begins at step 500 and proceeds to step 504 where an application program (not shown) sends a request to MOB 114 (FIG. 3). The request may be, for example, an enrollment or unenrollment, and includes an AppId. Thereafter, the process proceeds to step 504 where MOB 114 invokes an appropriate API 314-332 to handle the request. The invoked API acquires the proper binding information from the function getagbinding 312.

Getagbinding uses the passed AppId to traverse the agent list 306 for a matching entry. If a matching entry is found, then the binding handle corresponding to the matching entry is passed back to the invoking API. If a matching entry is not found, then an error is returned to the invoking API, which in turn informs the application program. Assuming, that a matching entry is found, the invoking API calls a corresponding API in the agent identified with the found binding handle. Thereafter, at step 508 the agent processes the request, and proceeds to return a result of the request to MOB 114 at step 510. MOB 114 proceeds to return the result to the calling application program at step 512, and the process ends.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

---

MOB/Agent API's
The following methods (published API points) are available in the MOB/agent:

AVAILABLE

The Task Processor, at time intervals specified by the customer in the system parameter resource file (sys_parm.rc), calls mobdef::Available to see if an application agent is "awake". This method provides all "RPC ping" to make sure that the agent is up and responding to client input (conveyed to the agent by calls from the DAAT server). The list of applications checked is the cached list of applications maintained by the MOB and Task Processor.

Method Declaration:
    void mobdef::Available( char *appl_id_p,
              error_status_t *AG_st_p );

Inputs:

MOB/Agent API's
The following methods (published API points) are available
in the MOB/agent:

```
       char *appl_id_p - Application ID whose server should be contacted.
Outputs:
       error_status_t *AG_st_p - Return value containing an error status
       code.
Processing Flow:
       get binding handle for application ID (call
            mobdef::getagbinding)
       if (no handle stored for application)
            set AG_st for no binding handle available
       else
            call AgAvailable in the agent
                 AgAvailable(handle_t    IDL_handle
                             char        *appl_id_p,
                             error_status_t *AG_st_p );
            set return code
       return
copyright 1995 International Business Machines
```

DELETE

This method calls the agent's AgDelete function which deletes the User
ID from agent database.
Method Declaration:
```
       void mobdef::Delete ( char *appl_id_p,
                             char *current_id_p,
                             char *user_record
                             error_status_t *AG_st_p );
Inputs:
       char *appl_id_p - Application ID whose server should be contacted
       char *current_id_p - User ID to delete
       char *user_record - Any user data needed by the agent to complete
       processing of the delete request for the User ID.
Outputs:
       error_status_t *AG_st_p - Return value containing an error status
       code.
Processing Flow:
       get binding handle for application ID (call
            mobdef::getagbinding)
       if (no handle stored for application)
            set Ag_st for no binding handle available
       else
            call AgDelete in the agent
                 AgDelete(handle_t    IDL_handle
                          char        *appl_id_p,
                          error_status_t *AG_st_p );
            set return code
       return
copyright 1995 International Business Machines
```

LIST

This method calls the agent's AgDelete function which provides a
delimited list of all the ID's currently in the application server's database.
Method Declaration
```
       void mobdef::List(
                       char *appl_id_p,
                       char *list_of_ids_p,
                       error_status_t *AG_st_p );
Inputs:
       char *appl_id_p - Application ID whose server should be contacted.
Outputs:
       char *list_of_ids_p - pointer to delimited list of user ID's
            currently registered on the Application server's database.
       error_status_t *AG_st_p - Return value containing
            an error status code.
Description:
       Provide a delimited list of all the ID's currently in the
       Application server's database
Notes:
       There are three ways to have implemented the
       transfer of the large amount of List data. The first would be
       to pass the ID's in a single string buffer and delimit them with a
       special character. This has limitations based on the server having
       to allocate space for a string of unknown size.
```

The second way would be to use a DCE RPC pipe to manage the
data
transfer. The client push routine would have to build a linked list
and assemble the data as it comes across. The problem with this
approach is that the final format for the data is in a LinkedList
object and this approach could cause the data to have to be
marshalled twice - once when it comes in via the push() routine and
yet again to be added to the LinkedList object.
The third is to use a context handle and create a loop in the client
that calls AgList once for every ID. The context handle would be
able to keep track of the IDs sent on the server and would always
send the next ID and/or notify the client when the last ID has been
sent. This way is probably the most expensive, but because C++ is
calling C and there would be no way for C to call C++ (like #2
needs) this may be the best option.
Processing Flow:
```
       get binding handle for application id
       if (no handle stored for application)
            set AG_st for no binding handle available
       else
            create and initialize pipe state variable
            create and initialize pipe data type structure
            call AgList in the agent
                 AgList(handle_t    IDL_handle
                        char        *appl_id_p,
                        char        *list_of_ids_p,
                        error_status_t *AG_st_p );
            set return code
       return
copyright 1995 International Business Machines
```

QUERY

This method calls the agent's AgQuery function which provides the
resource record for a given User ID in the specified application.
Method Declaration:
```
       void mobdef::Query(
                       char *appl_id_p,
                       char *current_id_p,
                       char *resource_record_p,
                       error_status_t *AG_st_p );
Inputs:
       char *appl_id_p - Application ID whose server should be contacted.
       char *current_id_p - ID whose query record is requested.
Outputs:
       char *query_record_p - pointer to query record
       error_status_t *AG_st_p - return value containing an error status
       code.
Processing Flow:
       get binding handle for application ID (call
            mobdef::getagbinding)
       if (no handle stored for application)
            set AG_st for no binding handle available
       else
            call AgQuery in the agent
                 AgQuery(handle_t    IDL_handle
                         char        *appl_id_p,
                         char        *current_id_p,
                         char        *resource_record_p,
                         error_status_t *AG_st_p );
            set return code
       return
copyright 1995 International Business Machines
```

REGISTER

This method calls the agent's AgRegister function which enrolls the
specified User ID into the specified application. The related information
for this user to receive an ID for this application is passed in the
user_record parameter. This is the formatted string that only the client and
the agent can read. The data is parsed and read by the agent. See format-
ted
text string in the BACKGROUND INFORMATION section for more
details.
Method Declaration:
```
       void mobdef::Register(
                       char *appl_id_p,
                       char *new_id_p,,
                       char *user_record,
                       char *txt_msg_p,
                       error_status_t *AG_st_p )
Inputs:
```

-continued

```
        char *appl_id_p - Application ID whose server should be contacted.
        char *new_id_p - ID to be created
        char *user_record - Data used to create the ID specified in
            new_id_p
Outputs:
        char *text_msg_p - Message returned by agent to indicate any
            pertinent information about the status of the registration request
        error_status_t *AG_st_p - Return value containing an error status
            code.
Processing Flow:
        get binding handle for application ID (call
            mobdef::getagbinding)
        if (no handle stored for application)
            set AG_st for no binding handle available
        else
            call AgRegister in the agent
                AgRegister( handle_t    IDL_handle,
                    char    *appl_id_p,
                    char    *new_id_p,,
                    char    *user_record,
                    char    *txt_msg_p,
                    error_status_t *AG_st_p )
            set return code
        return
copyright 1995 International Business Machine
```

RENAME

```
This method calls the agent's AgRename function which renames the User
ID specified in current_id_p to new_id_p.
Method Declaration:
        void mobdef::Rename(
                char *appl_id_p,
                char *current_id_p,
                char *new_id_p,
                char *user_record,
                error_status_t *AG_st_p );
Inputs:
        char *appl_id_p - Application ID whose server should be contacted.
        char *current_id_p - Current ID to be renamed.
        char *new_id_p - New name for the ID,
        char *user_record - Any user data needed by the agent to complete
            processing of the rename request for the User ID.
Outputs:
        error_status_t *AG_st_p - Return value containing an error status
            code.
Description:
        Renames the id specified in current_id_p to new_id_p.
Processing Flow:
        get binding handle for application ID
            (call mobdef::getagbinding)
        if (no handle stored for application)
            set AG_st for no binding handle available
        else
            call AgRename in the agent
                AgRename( handle_t    IDL_handle,
                    char    *appl_id_p,
                    char    *current_id_p,,
                    char    *new_id_p,
                    error_status_t *AG_st_p )
copyright 1995 International Business Machines
```

RESUME

```
This method calls the agent's AgResume function which resumes the
privileges/capabilities of the User ID specified in current_id_p after it has
been suspended. The User ID gets suspended after a call to the MOB's
mobdef::Suspend method which in turn calls the agent's AgSuspend
function.
Method Declaration:
        void mobdef::Resume(
                char *appl_id_p,
                char *current_id_p,
                error_status_t *AG_st_p );
Inputs:
        char *current_id_p, - Current ID to be resumed.
Outputs:
        error_status_t *AG_st_p - return value containing an error status
            code.
Processing Flow:
        get binding handle for application ID
            (call mobdef::getagbinding)
```

```
        if (no handle stored for application)
            set AG_st for no binding handle available
        else
            call AgResume in the agent
                AgResume( handle_t    IDL_handle
                    char    *appl_id_p,
                    char    *current_id_p,,
                    error_status_t *AG_st_p );
            set return code
        return
copyright 1995 International Business Machines
```

SUSPEND

```
This method calls the agent's AgSuspend function which suspends the
privileges/capabilities of the User ID specified in current_id_p. The User
ID is reenabled with a subsequent call to the MOB's mobdef::Resume
method which in turn calls the agent's AgResume function.
Method Declaration:
        void mobdef::Suspend(
                char *appl_id_p,
                char *current_id_p,
                error_status_t *AG_st_p );
Inputs:
        char *current_id_p - Current ID to be suspend.
Outputs:
        error_status_t *AG_st_p - Return value containing an error status
            code.
Processing Flow:
        get binding handle for application ID
            (call mobdef::getagbinding)
        if (no handle stored for application)
            set AG_st for no binding handle available
        else
            call AgSuspend in the agent
                AgSuspend( handle_t    IDL_handle,
                    char    *appl_id_p,
                    char    *current_id_p,,
                    error_status_t *AG_st_p );
            set return code
        return
copyright 1995 International Business Machines
```

TRANSFER

```
This method calls the agent's AgTransfer function which transfers
ownership of current_id_p to new_id_p for the specified application.
Method Declaration:
        void mobdef::Transfer(
                char *appl_id_p,
                char *current_id_p,
                char *new_id_p,
                char *new_id_cc,
                char *user_record,
                error_status_t *AG_st_p );
Inputs:
        char *current_id_p - Current ID to be suspend
        char *current_id_p - Current ID to be suspend
        char *new_id_p - New ID to own current_id_p's resources.
        char *new_id_cc - New Owner's country code.
        char *user_record - new resource record used to gather information
            from the server at the agent level.
        char *user_record - Any user data needed by the agent to complete
            processing of the transfer request.
Outputs:
        error_status_t *AG_st_p - return value containing an error status
            code.
Processing Flow:
        get binding handle for application ID
            (call mobdef::getagbinding)
        if (no handle stored for application)
            set AG_st for no binding handle available
        else
            call AgTransfer in the agent
                AgTransfer( handle_t    IDL_handle,
                    char    *appl_id_p,
                    char    *current_id_p,,
                    char    *new_id_p,
                    error_status_t *AG_st_p );
            set return code
        return
copyright 1995 International Business Machines
```

UPDATE

This method calls the agent's AgUpdate function which replaces the resource record (for the specified User ID, current_id_p, in the specified application, appl_id_p) currently stored in application server's database with the one passed via upd_record_p. upd_record_p is the formatted string that only the client and the agent can read. The data is parsed and read by the agent. See formatted text string in the BACK-GROUND INFORMATION section for more details.

Method Declaration:
```
void mobdef::Update(
        char *appl_id_p,
        char *current_id_p,
        char *upd_record_p,
        error_status_t *AG_st_p );
```
Inputs:
   char *current_id_p - current id to be suspend
   char *upd_record_p - new resource record used to replace the resource record currently stored in the application server database.
Outputs:
   error_status_t *AG_st_p - return value containing an error status code.
Return Codes:
   void
Processing Flow:
   get binding handle for application ID
      (call mobdef::getagbinding)
   if (no handle stored for application)
      set AG_st for no binding handle available
   else
      call AgUpdate in the agent
         AgUpdate( handle_t    IDL_handle,
                   char       *appl_id_p,
                   char       *current_id_p,
                   char       *upd_record_p,
                   error_status_t *AG_st_p );
      set return code
   return copyright 1995 International Business Machines
Internal MOB method (not published API)

getagbinding

This method is called by other methods in the mobdef class to locate a binding handle for the specified application. Traverse the linked list searching either for a node having an appl_id entry matching that passed via appl_id_p or the end of the list. Once it is found, the binding handle is returned to the calling method via handle_t.

Method Declaration:
   handle_t mobdef::getagbinding( char *appl_id_p );
Inputs:
   char *appl_id_p - Application ID whose binding handle is being requested.
Outputs:
   none
Return Codes:
   handle_t - binding handle for the agent running and identified using the application ID.
Processing Flow:
   for each element in the ag_binding_info_list
      compare the requested application ID to the one in the current node
      if no match was found return NULL
      else return the binding handle for that application ID copyright 1995 International Business Machines

---

What is claimed is:

1. A method of invoking the resources of application programs executing in a distributed computing environment, each one of said application programs having an agent and a principal name, each one of said agents being identified by an individual binding handle, said method comprising the steps of:

storing said principal names and said binding handles together in a principal name list of a master object;

locating, in said principal name list, one of said stored binding handles for an identified one of said application programs to execute a request; and executing said agent identified by said binding handle to invoke said identified application program to execute said request.

2. The method of claim 1 further comprising the step of:
   indexing said principal name list so that each one of said binding handles is located by using one of said principal names corresponding to said one of said binding handles.

3. The method of claim 2 wherein each one of said binding handles are stored in a directory server, and said step of storing said principal names and binding handles includes the steps of:
   registering each one of said agents in said principal name list; and
   retrieving from said directory server one of said binding handles for each one of said registered agents.

4. The method of claim 3 further comprising the step of:
   receiving, in said master object, a request from a client, said request identifying one of said principal names.

5. The method of claim 4 wherein said step of locating includes the step of:
   locating, in said principal name list, one of said binding handles using said identified principal name.

6. The method of claim 5 wherein said master object includes a plurality of application procedure interfaces, and said step of executing includes:
   executing one of said plurality of application procedure interfaces corresponding to said request to invoke an application procedure interface in said one of said agents, said invoked application procedure interface invoking said application to execute said request.

7. An apparatus for invoking the resources of application programs executing in a distributed computing environment, each one of said application programs having an agent and a principal name, each one of said agents being identified by an individual binding handle, said apparatus comprising:
   means for storing said principal names and said binding handles together in a principal name list of a master object;
   means for locating, in said principal name list, one of said stored binding handles for an identified one of said application programs to execute a request; and
   means for executing said agent identified by said binding handle to invoke said identified application program to execute said request.

8. The apparatus of claim 7 further comprising:
   means for indexing said principal name list so that each one of said binding handles is located by using one of said principal names corresponding to said one of said binding handles.

9. The apparatus of claim 8 wherein each one of said binding handles are stored in a directory server, and said means for storing said principal names and binding handles includes:
   means for registering each one of said agents in said principal name list; and
   means for retrieving from said directory server one of said binding handles for each one of said registered agents.

10. The apparatus of claim 9 further comprising:
    means for receiving, in said master object, a request from a client, said request identifying one of said principal names.

11. The apparatus of claim 10 wherein said means for locating includes:
    means for locating, in said principal name list, one of said binding handles using said identified principal name.

12. The apparatus of claim 11 wherein said master object includes a plurality of application procedure interfaces, and said means for executing includes:

means for executing one of said plurality of application procedure interfaces corresponding to said request to invoke an application procedure interface in said one of said agents, said invoked application procedure interface invoking said application to execute said request.

13. A computer program product comprising:

a computer usable medium having computer readable program code means embodied in said medium for invoking the resources of application programs executing in a distributed computing environment, each one of said application programs having an agent and a principal name, each one of said agents being identified by an individual binding handle, said computer readable program code means including:

means for storing said principal names and said binding handles together in a principal name list of a master object;

means for locating, in said principal name list, one of said stored binding handles for an identified one of said application programs to execute a request; and         means for executing said agent identified by said binding handle to invoke said identified application program to execute said request.

14. The computer program product of claim 13 wherein said computer readable program code further comprises:

means for indexing said principal name list so that each one of said binding handles is located by using one of said principal names corresponding to said one of said binding handles.

15. The computer program product of claim 14 wherein each one of said binding handles are stored in a directory server, and said means for storing said principal names and binding handles includes:

means for registering each one of said agents in said principal name list; and     means for retrieving from said directory server one of said binding handles for each one of said registered agents.

16. The computer program product of claim 15 wherein said computer readable program code means further comprises:

means for receiving, in said master object, a request from a client, said request identifying one of said principal names.

17. The computer program product of claim 16 wherein said means for locating includes:

means for locating, in said principal name list, one of said binding handles using said identified principal name.

18. The computer program product of claim 17 wherein said master object includes a plurality of application procedure interfaces, and said means for executing includes:

means for executing one of said plurality of application procedure interfaces corresponding to said request to invoke an application procedure interface in said one of said agents, said invoked application procedure interface invoking said application to execute said request.

\* \* \* \* \*